Jan. 20, 1948. S. LETVIN 2,434,663
FLUID SEPARATOR
Filed Feb. 11, 1943
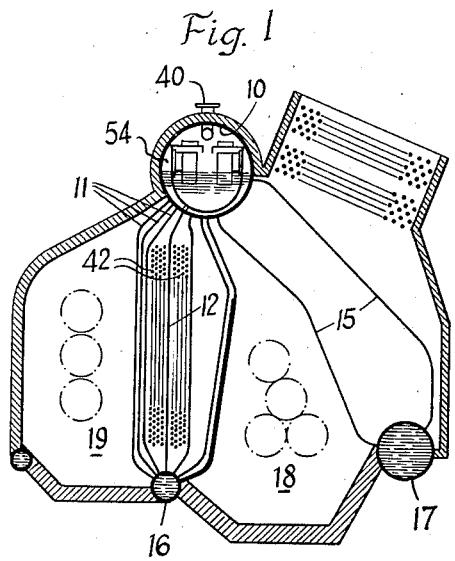
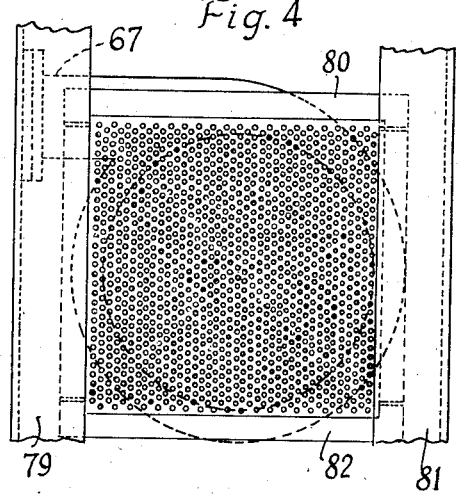
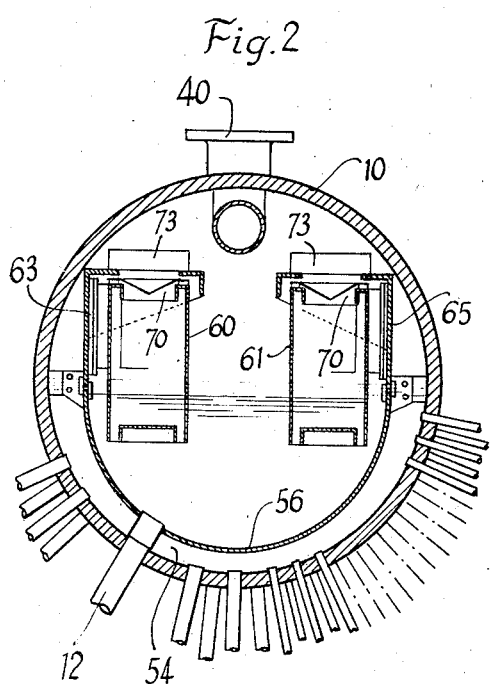
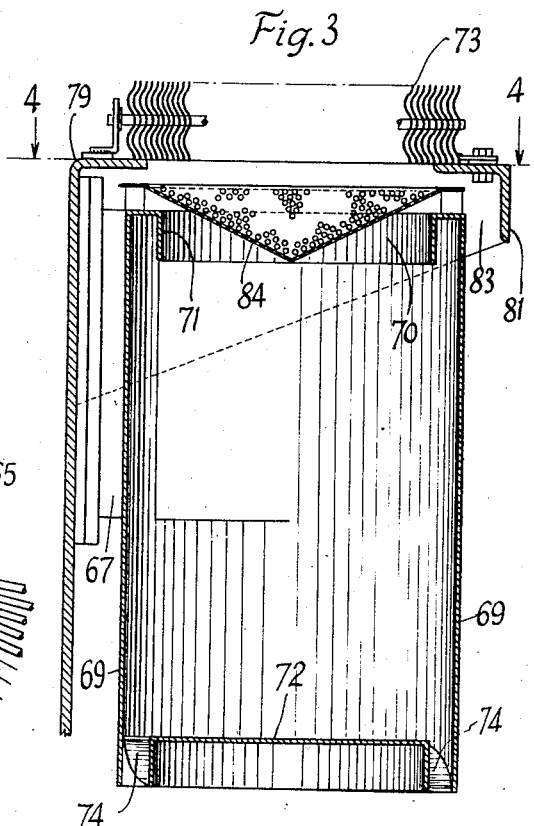
INVENTOR.
Samuel Letvin
BY
M. Holbrook, ATTORNEY Patented Jan. 20, 1948

2,434,663

UNITED STATES PATENT OFFICE 2,434,663

FLUID SEPARATOR

Samuel Letvin, Philadelphia, Pa., assignor to The Babcock & Wilcox Company, Rockleigh, N. J., a corporation of New Jersey Application February 11, 1943, Serial No. 475,477

3 Claims. (Cl. 183—83)

This invention relates to separators for fluids of different densities, and it is more particularly concerned with improvements in centrifugal separators for this purpose.

The invention may be considered as exemplified by a steam and water separator employed as a part of a steam generator, and it is an object of the invention to so improve the steam and water separation capacities of such generators that their steaming capacities and water storage capacities for a given drum capacity are increased, a generator being so improved that it will produce steam of high quality even under such difficult drum water level conditions as are encountered in marine practice.

The invention relates to a type of fluid separator involving an upright whirl chamber into which mixtures of steam and water are tangentially discharged at high velocity. This discharge sets up centrifugal separating action within the whirl chamber, and the separated steam passes upwardly from the whirl chamber through an auxiliary separator which may be a multiple plate scrubber. The separated water is discharged from the bottom of the whirl chamber through a restricted opening. Specifically, the embodiment of this invention involves a distributor or perforated steam and water separator baffle disposed above the whirl chamber and across the path of the steam toward its outlet. This distributor, in a preferable form, is an inverted perforated metal cone which constitutes a barrier and collects any entrained droplets of water leaving the surface of the vortex in the whirl chamber, this cone stopping the entrained droplets, holding them by cohesion, and draining them back into the center of the whirl chamber vortex where the whirling motion of the vortex has set up a zone of reduced pressure which allows the water dropping from the inverted cone apex to fall to the water level in the whirl chamber.

The invention will be described with reference to the preferred embodiment illustrated in the accompanying drawings and other objects of the invention will appear as the description proceeds.

In the drawings:

Fig. 1 is a vertical section of a steam generator in which the invention is employed;

Fig. 2 is a transverse vertical section of the steam and water drum of the Fig. 1 generator;

Fig. 3 is a vertical section through the steam and water separator; and

Fig. 4 is a plan, or horizontal section through the steam and water separator at the position indicated by the line 4—4 of Fig. 3.

The illustrative separator is employed in a steam generator such as that shown in Fig. 1, the steam and water mixtures being discharged at high velocity into the drum 10 by the steam generating tubes 11—15. The latter communicate at their lower ends with the drums or headers 16 and 17 which receive water from the water space of the drum 10 through downcomers some of which are provided by the large diameter tubes 12.

The steam generating tubes are subject to the heat from the gases from the main furnace 18 or the superheater furnace 19, each of which may be fired by a plurality of burners.

Steam is separated from water in the drum 10, the steam proceeding through the offtake 40 and connecting conduits to the superheater 42.

The steam and water mixtures discharged into the drum 10 by the steam generating tubes 11—15 enter a separate inlet chamber 54 formed within the drum by a diaphragm 56 and other co-operating plates. This inlet chamber extends over a portion of the length of drum covering the widths of the banks of steam generating tubes, and it is in communication with a plurality of centrifugal steam and water separators 60—61 which are preferably secured in operative position by attachment to the upright portions 63 and 65 of the diaphragm plate 56. Each separator involves a circular whirl chamber having a tangential inlet structure 67 which is utilized to secure the separator to the wall 63 and 65 of the inlet chamber 54.

The velocity head of the steam and water mixtures entering the separators depends upon the pressure drop between the inlet chamber 54 and the remainder of the space within the drum 10. The tangential flow to the circular whirl chambers of the separators causes a swirling flow of the steam and water mixture around the wall of the whirl chamber, the centrifugal force being effective in separating the steam and water. The steam separated from the water passes upwardly through a central opening 70 defined by a wall 71 at the top of the whirl chamber.

The whirl chamber outlets for separated water are limited to a narrow annular zone adjacent the perimeters of the whirl chambers and at their lower ends. This zone is defined in each case by the whirl chamber casing or shell 69, and a circular flanged base 72. Preferably, the base and the shell are separated by curved vanes 74 which separate a plurality of water outlets. The forces involved in the flow of water downwardly through these outlets prevents the establishment of water levels in the whirl chamber corresponding to the exterior, or drum water level, and they enable the steam generator to effectively operate at drum water levels ranging substantially from the tops to the bottoms of the whirl chambers.

Above the central steam outlet 70 of each whirl chamber, there is a scrubber or multiple plate steam and water separator 73. This auxiliary separator is preferably spaced from the top of the whirl chamber and secured to fixed structural members 79—82.

It has been found that the distribution of residual moisture particles across the swirling stream leaving the outlet 70 is non-uniform with a zone of higher moisture concentration. Some of this moisture may be projected radially to the lateral annular opening 83. An inverted perforated cone 84 is provided to equalize the upward flow of the vapor. It also acts to separate moisture by surface adhesion and drain the moisture down to the apex of the cone which is located at the center of the vertical flow and is therefore at a position of lower pressure. From the apex the moisture drops into the whirl chamber and is discharged from the bottom with the flow through outlets 74.

The inverted cone, or pyramid, breaks up any slugs of water which might otherwise attempt to pass through the auxiliary separator 73. Under some conditions, these slugs of water might be so large that appreciable quantities of water would pass through the separator, but due to the action of the cone, they are broken up so that the auxiliary separator may effectively function.

As the flow area of perforations in the cone 84 shown is less than the circular flow area of the outlet 70 and thereby imposes a restriction to upward flow through the central portion of the whirl chamber. Additional lateral flow area is provided by spacing the upper outer edge of the cone above the top of the cylindrical member 71 so that some fluid may be discharged through the annular lateral opening 83.

The fluid that passes upwardly through the perforations in the member 84 will have lost its angular velocity and the velocity of approach to the superposed multiple plate separator 73 is relatively uniform. This uniformity of velocity is conducive to better loading conditions and the separator 73 is thus more effective.

The member 84 has been referred to as being of conical form but it is also contemplated that an inverted pyramid or similarly symmetrical member might be used in the manner described.

What is claimed is:

1. In a fluid separator, means forming a whirl chamber, means forming a tangential whirl chamber inlet through which a mixture of different density fluids enters the whirl chamber at high velocity and sets up whirling action therein, spaced whirl chamber outlets for separated fluids of different densities, said outlets including a bottom outlet for fluid of greater density and a top outlet for fluid of lower density, a multiple plate auxiliary separator above the top outlet and spaced from the top of the whirl chamber to form a supplementary and lateral fluid outlet therebetween, and a perforated metallic baffle construction interposed in advance of the inlet side of the auxiliary separator but having its top disposed above the bottom of said lateral outlet, said baffle construction being of inverted cap-shape and having upwardly diverging portions directing impact fluid of higher density radially outwardly of the whirl chamber and toward the supplementary outlet, the baffle construction having a V-shaped section in any plane extending through the upright axis of the baffle.

2. In a fluid separator, an upright whirl chamber having a tangentially arranged inlet, a main outlet for a lower density fluid at the upper part of the whirl chamber, an auxiliary separator including elements disposed across said outlet, an auxiliary lateral outlet between the auxiliary separator and the top of the whirl chamber, a perforated baffle structure below the auxiliary separator and disposed across the upward flow of fluid from the whirl chamber, said baffle structure having wall components extending convergently downwardly toward the center of the whirl chamber, the top of said baffle structure being spaced from the top of the whirl chamber, and means forming a restricted outlet for separated fluid of higher density at the lower end of the whirl chamber.

3. In a fluid separator, an upright whirl chamber having a tangential inlet for mixtures of fluids of different densities, an auxiliary separator including spaced element disposed across an upper whirl chamber outlet for lower density fluid, an auxiliary lateral outlet for lower density fluid between the auxiliary separator and the top of the whirl chamber, a perforated metallic cap-like member constituting a baffle structure below the auxiliary separator and disposed across the upward flow of fluid from the whirl chamber, the cap-like structure having perforate sides converging downwardly into the whirl chamber from its top, the top of said cap-like structure being spaced from the top of the whirl chamber, and means forming restricted outlet for separated fluid of higher density at the lower end of the whirl chamber.

SAMUEL LETVIN.

REFERENCES CITED

The following references are of record in the file of this patent:

UNITED STATES PATENTS

| Number | Name | Date |
|---|---|---|
| 727,480 | Stevens | May 5, 1903 |
| 383,801 | Downton | May 29, 1888 |
| 2,298,285 | Fletcher | Oct. 13, 1942 |

FOREIGN PATENTS

| Number | Country | Date |
|---|---|---|
| 9,630 | Great Britain | Apr. 20, 1911 |